Aug. 4, 1925.
F. H. WARD
1,548,078
TUBULAR CROSSBAR CONNECTION IN AUTOMOBILE FRAMES
Filed Sept. 7, 1923
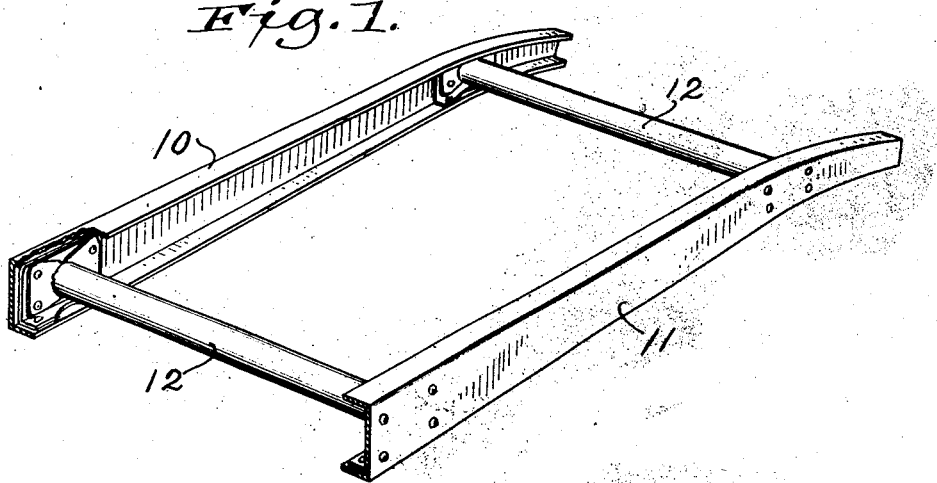
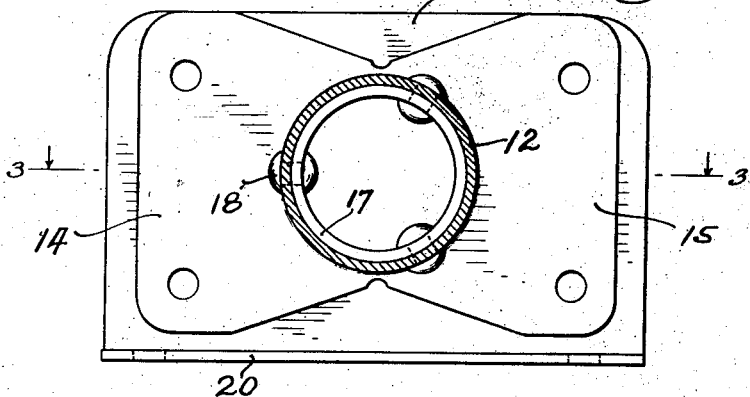
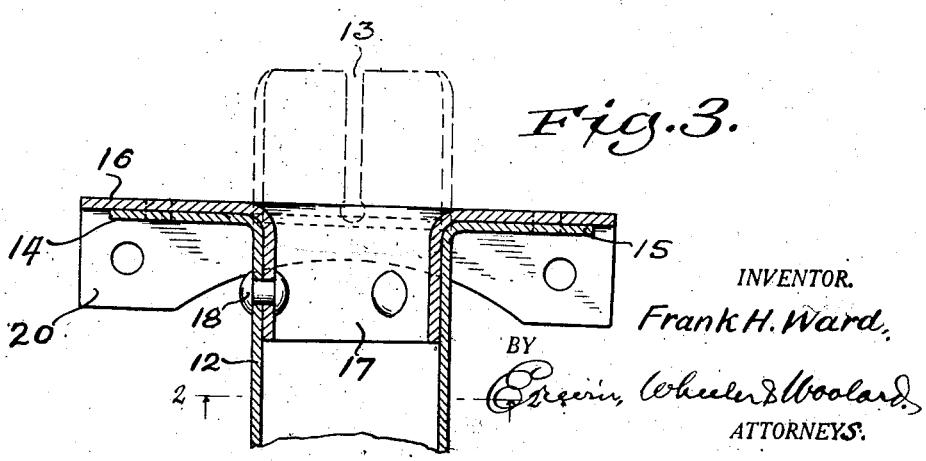
INVENTOR.
Frank H. Ward,
BY
ATTORNEYS.

Patented Aug. 4, 1925.

1,548,078

UNITED STATES PATENT OFFICE.

FRANK H. WARD, OF MILWAUKEE, WISCONSIN, ASSIGNOR TO A. O. SMITH CORPORATION, OF MILWAUKEE, WISCONSIN, A CORPORATION OF NEW YORK.

TUBULAR CROSSBAR CONNECTION IN AUTOMOBILE FRAMES.

Application filed September 7, 1923. Serial No. 661,390.

*To all whom it may concern:*

Be it known that I, FRANK H. WARD, a citizen of the United States, and a resident of the city of Milwaukee, in the county of Milwaukee and State of Wisconsin, have invented certain new and useful Improvements in Tubular Crossbar Connections in Automobile Frames; and I do declare the following to be a clear, exact, and complete description thereof, such as will enable others skilled in the art to which the invention pertains to make and use the same, reference being had to the accompanying drawing for an illustration of a construction in which my invention has been embodied.

In the construction of automobile and other vehicle frames, the use of tubular cross bars attached at their opposite ends to the longitudinally extending side bars, contributes greatly to an increased rigidity of the frame in which the two types of bars are incorporated and united in a manner to constitute a permanent structure. A frame so constructed will therefore present a more effective resistance to the weaving strains to which the vehicle of which it forms a part is subjected in moving over uneven road surfaces.

My invention relates particularly to the means employed for effecting the attachment of the cross bars to the side bars in the erection or construction of the frame, in such manner that the torsional stresses imposed upon the tubular cross bars are resisted at the points of attachment of the cross bars to the side bars, and so that the strains are better distributed throughout the frame. Such points of attachment have heretofore constituted features of weakness in the construction of the frame, which it is the purpose of the present invention to overcome.

This desirable result is achieved by means of devices the construction and arrangement of which will now be specifically described, and the novelty of which will be pointed out in the appended claims.

In the drawings:

Figure 1 is a perspective view of the forward portion of an automobile frame, constructed in accordance with my invention.

Fig. 2 is an enlarged transverse sectional view on the line 2—2, Fig. 3, of one of the tubular cross bars, and showing the plates at one end through the medium of which the cross bar may be attached to the side bar.

Fig. 3 is a view on a horizontal section through one end of the tubular cross bar, taken on the line 3—3, Fig. 2, and showing details of construction of the means for effecting the attachment referred to.

Referring to the drawing, Figure 1 illustrates the forward end of an automobile frame, in which the numerals 10 and 11 indicate the usual channel side bars, connected by cross bars 12 so as to form a permanent structure. Usually the cross bars are formed as channel members, but frames so constructed do not possess the desired degree of rigidity, and consequently such frames are subject to a weaving or racking motion which may act destructively upon the parts carried by the frame.

In my present invention the cross bars 12 are tubular in form, the purpose of the employment of the tubular cross bars being to increase the torsional resistance thereof, so that a frame embodying tubular cross bars in its construction is not subject to the displacements above mentioned, although the torsional strains are concentrated at the points of connection of the ends of the tubular cross bars with the side bars.

In my present invention, I have greatly improved the manner of connecting the ends of the tubular cross bars to the side bars, so that a wider distribution of the concentrated strains is effected.

In achieving this result I make a diametral incision 13, across the opposite ends of the tubular cross bar, as indicated in dotted lines in Fig. 3. I then flatten out in opposite directions the split ends of the cross bar, so as to constitute wings 14 and 15, extending laterally from and at opposite sides of the tubular cross bar 12, and integrally therewith.

On account of the comparative thinness of the metal of which the tubular cross bar is formed, the wings 14 and 15 will exert a considerable shearing strain upon the rivets which are employed to connect the wings 14 and 15 to the web of the side bar. In order to overcome the objection I form upon one face of a plate 16 an upstanding tubular boss 17, of a diameter equal to the inside diameter of the cross bar, and insert such boss at each end of the bar, with the plate resting in contact with the wings 14 and 15 as shown in Fig. 3. A plurality of rivets 18 are set in registering radial openings passing through the boss 17 and the tubular cross bar, so that the two elements of construction are substantially united.

The plate 16 is of a width which should be equal to that of the channel in the side bar. The end of the cross bar with the plate 16 connected thereto in the manner described is inserted in the channel of the side bar and permanently attached thereto by means of rivets passing through registering holes in the wings 14 and 15, the plate 16 and the web of the channel cross bar. Thus a permanent structure is produced. The lower edge of the plate 16 may be provided with a laterally extending flange 20, which is adapted to rest upon the lower flange of the side bar and be riveted thereto.

It will thus be seen that the connection between the end of the tubular cross bar and the side bar is greatly strengthened, and that the torsional resistance of the tubular cross bars is transmitted directly to the side bars, so that the frame will maintain a greater degree of rigidity, and be less responsive to variations when the vehicle encounters unfavorable road conditions. By thus preventing the weaving or racking of the frame at such times, the parts supported upon the frame are preserved from damage.

Having thus described my invention, what I claim and desire to secure by Letters Patent of the United States, is:

1. In an automobile frame, side bars and tubular cross bars, the cross bars being provided at each end with integral, laterally extending wings, and plates bearing at one side against the side bar and against the said wings at the other, the plates each having a tubular boss entered into the end of the cross bar and secured therein, and means for attaching the cross bar and the plates to the side bars.

2. In an automobile frame, channel side bars and tubular cross bars, the cross bars having at each end laterally extending integral wings which rest in the channels of the side bars, and plates interposed between the webs of the side bars and the said wings and each provided with a boss entered into the end of the cross bar and secured therein, and means for attaching the plates and wings to the side bars.

3. In an automobile frame, channel side bars having a web and flanges extending laterally therefrom, tubular cross bars attached at each end to the side bars, the said cross bars being provided with integral wings extended in parallelism with the webs of the side bars, a plate interposed between the wings and web at each end of the cross bar and having a tubular boss entered into the end of the cross bar and secured thereto, each said plate having a flange adapted to rest against a flange of the side bar, and means for securing the wings and plates to the side bar.

4. In an automobile frame, a tubular cross bar having at each end integral, laterally extending wings, and plates bearing against the said wings, each plate having a tubular boss entered into the end of the cross bar and secured therein to constitute a permanent structure.

In testimony whereof, I have signed my name at Milwaukee, this 4th day of September, 1923.

FRANK H. WARD.

Witnesses:
W. F. WOOLARD,
EMMA HAUG.